Dec. 13, 1955  H. RICHTER  2,726,929
MANUFACTURE OF STANNOUS SULFATE FROM TIN AND SULFURIC ACID
Filed Jan. 31, 1951
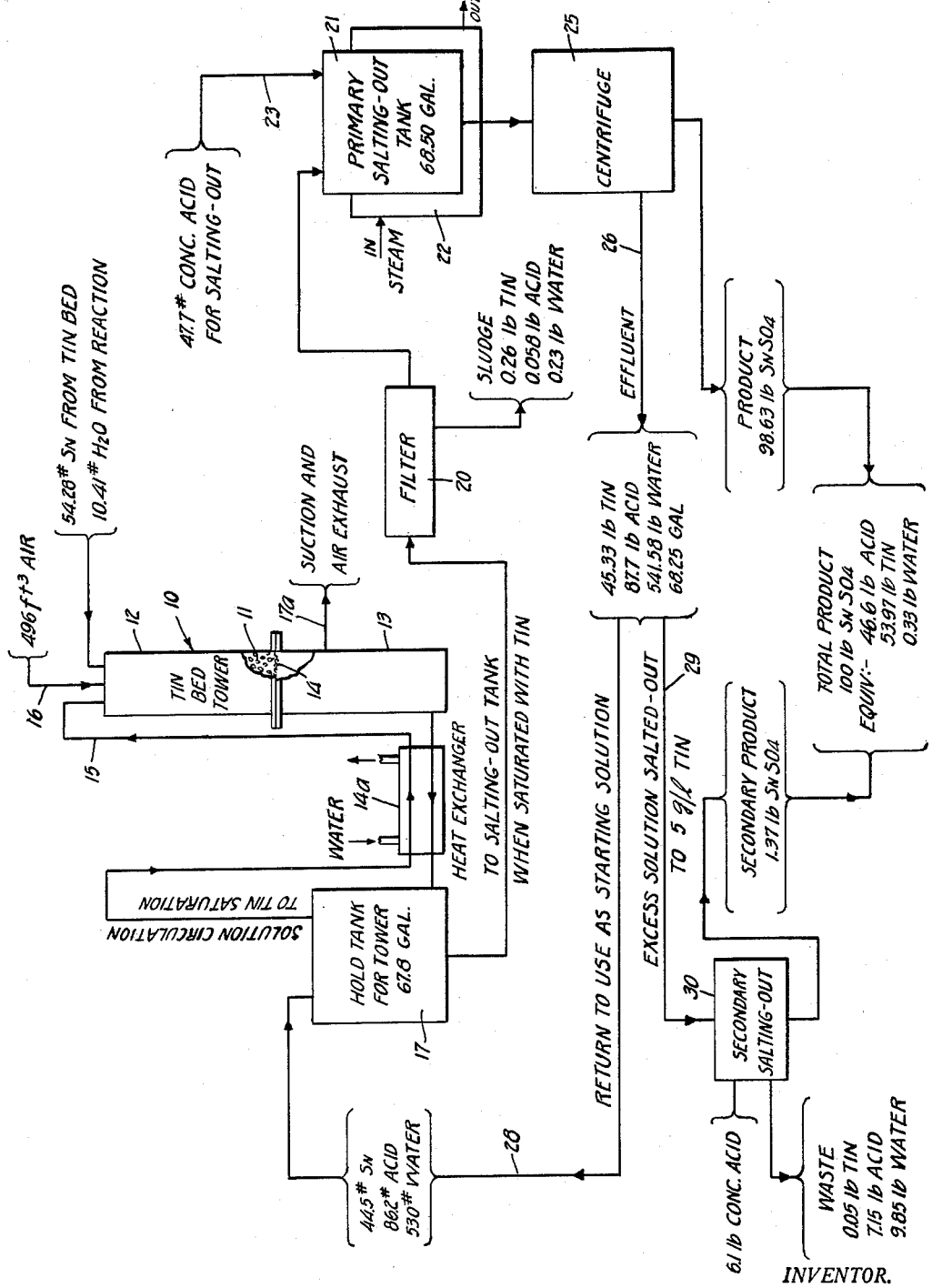
INVENTOR.
Hartmut Richter
BY
Moses, Nolte, Crews & Berry
ATTORNEYS

United States Patent Office 2,726,929
Patented Dec. 13, 1955

2,726,929

MANUFACTURE OF STANNOUS SULFATE FROM TIN AND SULFURIC ACID

Hartmut Richter, Rahway, N. J., assignor to Metal & Thermit Corporation, New York, N. Y., a corporation of New Jersey Application January 31, 1951, Serial No. 208,777

11 Claims. (Cl. 23—117)

The present invention relates to the manufacture of stannous sulfate.

Metallic tin, even when finely divided, reacts only slowly with non-oxidizing acids, such as sulfuric and hydrochloric acids. In the case of sulfuric acid, the use of either excess acid or heat to speed up the reaction would be self-defeating because of the adverse effect of these conditions on the solubility of stannous sulfate. The tin soon becomes coated with a film of insoluble stannous sulfate which effectively stops further attack.

One object of the present invention is to provide a new and improved process of producing a stable solution of stannous sulfate of as high a tin content as possible.

In accordance with the process of the present invention, use is made of the oxidation of moist tin by oxygen either as part of air or by itself to form stannous oxide which as it is formed readily dissolves in cold dilute sulfuric acid to yield a solution of stannous sulfate according to the following equations:

$$2Sn + O_2 \rightarrow 2SnO \qquad (1)$$
$$SnO + H_2SO_4 \rightarrow SnSO_4 + H_2O \qquad (2)$$

It should be noted that water is formed in the reaction which is taken into account in the operation of recovering the stannous sulfate from the solution produced, as will be more fully described. It is also pointed out that the rate of reaction is governed, among other things, by the surface area of the tin which is exposed to the action of air or oxygen.

The tin bed employed for the reaction should present a relatively large surface area per unit weight and should therefore be in pervious form and more specifically in finely divided form such as feathered tin or shot tin form. These are well known articles of commerce and may be made by pouring molten tin into water. Air is passed through the tin bed by means of a blower or suction means to effect forced aeration. It has been found that the rate of tin pickup of the sulfuric acid solution is directly proportional approximately to tin bed depth, provided that liquid and air are proportionally increased.

Care should be taken to see that the initial oxidation of the tin does not go to insoluble stannic oxide or that the stannous sulfate solution is not further oxidized by excess air to form unstable stannic sulfate solutions which are strongly susceptible of hydrolysis. The adverse reactions to avoid are as follows:

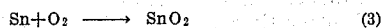
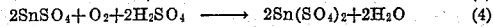
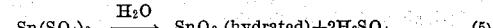
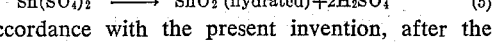

$$Sn + O_2 \rightarrow SnO_2 \qquad (3)$$
$$2SnSO_4 + O_2 + 2H_2SO_4 \rightarrow 2Sn(SO_4)_2 + 2H_2O \qquad (4)$$
$$Sn(SO_4)_2 \xrightarrow{H_2O} SnO_2 \text{ (hydrated)} + 2H_2SO_4 \qquad (5)$$

In accordance with the present invention, after the formation of the stannous sulfate in solution, recovery of the stannous sulfate therefrom is accomplished partly by heating the solution in order to take advantage of the reverse solubility of stannous sulfate and partly by salting-out with the sulfuric acid needed for the next batch.

Because of the reverse solubility factor, the reactions of the present invention are run at room temperature and desirably between 20° and 25° C. As long as the solution is not too close to the saturation point, there is no great objection to the use of a higher temperature, but from the standpoint of simplicity or if the process is to be operated between narrow limits, it would be preferable to hold the temperature uniform.

The initial concentration of the sulfuric acid flowing into contact with the tin bed must be held within certain limits. On the one hand, it must be sufficiently high to furnish enough sulfate radicals to form stannous sulfate at the desired tin concentrations. On the other hand, it must not be so high as to inhibit attack on the tin bed because of the salting-out effect of excess free acid on tin-rich solutions. Tests on the effect of free sulfuric acid on the solubility of stannous sulfate at 25° C. show a maximum tin concentration of 183 grams per liter corresponding to 150 grams per liter of sulfuric acid at zero free acidity. Therefore, an initial acid concentration of from 145 to 155 grams per liter is selected as a suitable one for the solution which is recycled through the tin bed in the reaction chamber until a saturated solution of stannous sulfate is obtained.

In the present process, although slightly basic solutions containing more stannous oxide dissolved in sulfuric acid than is called for by the stoichiometric requirements for stannous sulfate may be produced, since such basic solutions can accommodate more tin than normal ones, care is taken to see that the solutions are not too basic, preferably containing not more than ten percent of tin in excess of the stoichiometric amount. Basic solutions are undesirable because of their relative instability. This might lead to a plugging of the tin bed because of deposition of solids. In accordance with the present invention, the process is carried out to get stannous sulfate from the substantially normal solutions without employing more acid for salting-out purposes than can be accommodated in the next batch.

One way to recover stannous sulfate from the processed liquors would be to add enough concentrated sulfuric acid to reduce the tin solubility to a point where the resulting mother liquor may be wasted. This procedure would be suitable with highly basic tin-rich solutions. However, this procedure, when applied to weaker normal solutions, would cause excessive tin and acid losses. Hence, in accordance with the present invention, the salting-out procedure is carried out in such a manner that only enough acid would be added to satisfy the amount of stannous sulfate to be recovered. This step in itself would produce a small yield, but when the mixture is also heated, the yield can be increased to a point where the outgoing acid as stannous sulfate is in balance with the amount of acid added.

The temperature required for the stannous sulfate recovery operation is about 70° C., although it may be either higher or lower, as for example between 65 and 75° C., depending to some extent on the composition of the particular stannous sulfate liquor. With a stannous sulfate solution containing 180 grams of tin per liter, a temperature of 70° C. is more than adequate.

The following specific example illustrates the recovery procedure as applied to the operation of an actual pilot plant producing solution of the following composition:

| | |
|---|---|
| Sn | g./l__ 162.6 |
| $Sn^{II}$ | g./l__ 156.0 |
| Percent reduction | [1] 96.5 |
| $SO_4$ | g./l__ 136.6 |
| Calculated free $H_2SO_4$ | g./l__ 2.6 |
| Sp. g | 1.256 |

[1] Solution had been standing for about a week before being used.

To 75 lbs. of this solution were added 10 lbs. of commercial 96% sulfuric acid and then another 75 lbs. of solution. The temperature of the mixture was raised to 70° C. and the stannous sulfate which had precipitated was recovered by centrifuging in a rubber lined centrifuge. There were obtained 18½ lbs. of stannous sulfate of the following analysis:

| | Percent |
|---|---|
| Total Sn | 53.97 |
| $Sn^{11}$ | 53.08 |
| Percent reduction | 98.5 |
| $SO_4$ | 43.6 |

The material was of commercial quality.
The acid content of the stannous sulfate was $$\frac{18.5 \times 43.6 \times 98}{96} = 8.2 \text{ lbs. } H_2SO_4$$

whereas the amount of acid introduced was 9.6 lbs. The analysis of 137 lbs. of filtrate which remained after the removal of the sulfate was as follows:

| | | |
|---|---|---|
| Total Sn | g./l. | 77.4 |
| $Sn^{11}$ | g./l. | 73.3 |
| Percent reduction | | 94.5 |
| $SO_4$ | g./l. | 149.2 |
| Calculated free $H_2SO_4$ | g./l. | 85.5 |
| Sp. g | | 1.18 |

The addition of the sulfuric acid brought about a 2% increase in volume and if this is taken into account, the adjusted total tin figure in the filtrate would be 79 g./l. Hence, the tin recovery was $$\frac{162-79}{162} = 51.5\%$$

As can be seen from this example, the original solution did not contain quite enough tin for a perfect balance between acid added and acid taken out in the form of sulfate. A solution which satisfies this requirement will have to contain 180 g./l. of tin at the start and 80 g./l. at the finish of the recovery operation. The material balance sheet has therefore been set up on that basis.

As pointed out, there is a slight volume increase because of the addition of salting-out acid. Another volume increase occurs during the building up of the batch since the reaction $SnO + H_2SO_4 = SnSO_4 + H_2O$ produces water. There will therefore always be a small quantity of partly depleted tin solution (80 g./l.) which cannot be returned to the process and which provides a convenient means of bleeding off soluble impurities. Before discarding it, however, it is necessary to recover the bulk of its tin value by a secondary recovery operation. For that purpose, enough additional 96% sulfuric acid was added to bring the free sulfuric acid concentration in the solution to 500 g./l. at which point the tin concentration had decreased to 5 g./l. The stannous sulfate was joined with the sulfate produced in the salting-out of the main batch, but the acid from the secondary salting-out operation was wasted.

Various other objects, features and advantages of the invention will be apparent from the following particular description and from an inspection of the accompanying flow sheet, in which is shown a form of arrangement which can be employed to carry out the process of the present invention, the figures shown in connection with this flow sheet being an example for the manufacture of 100 lbs. of stannous sulfate.

Referring to the flow sheet, the apparatus for carrying out the process of the present invention comprises a tower or reaction vessel 10 containing a bed 11 of shot tin. This tower comprises two steel sections 12 and 13 lined with lead and separated at their flange joint by a screen 14 supporting the tin bed 11. The upper tower section 12 contains the tin bed 11, while the lower tower section 13 serves as the solution reservoir and air escape chamber. As an alternative form, a ceramic pipe extends in the upper tower section 12 to the screen 14 and contains the tin bed.

The sulfuric acid aqueous solution after passing through a heat exchanger 14a where it is cooled by water to a temperature between 20 and 25° C. is delivered to the top of the tower 10 by a pipe 15 and is permitted to flow through the tin bed 11. The initial concentration of the sulfuric acid in this solution is between 145 and 155 grams per liter.

At the same time the sulfuric acid solution is flowing through the tin bed 11, oxygen is forced through the tin bed. The oxygen for the reaction is desirably supplied by either blowing or sucking air through the tin bed 11. In the specific form shown, air is admitted into the top of the tower 10 through an inlet pipe 16 and is drawn out of the lower tower section 13 through an outlet pipe 17a connected to a source of vacuum.

The liquid from the bottom of the tower 10 passes through the heat exchanger 14a where it is cooled and is then discharged to a hold tank 17. From this hold tank 17, the liquid is circulated back to the tower through the pipe 15. The recirculation of the liquid between the hold tank 17 and the tower 10 and between the tower and the hold tank is continued until the liquid becomes saturated with tin.

When the liquid in the hold tank 17 becomes saturated to the point where it has a tin concentration of about 180 grams per liter, the circulation of this liquid to the tower 10 is discontinued and the liquid is passed through a filter 20 and then into a primary salting-out tank 21. This tank 21 is heated by a steam jacket 22 to bring the temperature of the liquid therein to about 70° C. Concentrated sulfuric acid (commercial 96%) is added by a pipe 23 to the liquid in the salting-out tank 21 to precipitate the stannous sulfate. The mixture is delivered to a separator 25 shown in the form of a rubber lined centrifuge. The separated stannous sulfate is discharged through an outlet 26, while the effluent or mother liquor containing a tin concentration of about 80 grams per liter mainly in the form of dissolved stannous sulfate is returned to the hold tank 17 through a pipe 28 in amount sufficient to make up for the stannous sulfate separated out and to prepare the starting solution for the next batch. The excess effluent not required for the hold tank 17 is subjected to a secondary salting-out process to recover the bulk of its tin value before going to waste. Towards that end, the effluent from the centrifuge 25 is delivered through the pipe 29 into a secondary salting-out tank 30 into which is added enough concentrated sulfuric acid (commercial 96%) to bring the free sulfuric acid concentration in the solution to 500 grams per liter. This precipitates the stannous sulfate to the point where the tin concentration is decreased 5 grams per liter. The mother liquor with all its impurities is drained to waste, while the precipitated stannous sulfate is added to the batch of stannous sulfate produced in the primary salting-out process.

The process requires suitable valves and pumps in different parts of the system but these are not shown for the sake of simplification.

The tin bed 11 should be submerged in dilute sulfuric acid when not in use. If it is exposed, a film is formed on the tin bed which is believed to be stannic oxide and which will adversely affect the rate of tin pick-up. The tin bed so coated can be restored to usefulness by washing with 10% hydrochloric acid and thoroughly rinsing the tin bed with water before starting a run.

When a tin bed has deteriorated, it is likely to produce solutions containing too much stannic sulfate which causes undesirable sludging in the system. The resultant solution need not be discarded but may be restored to usefulness by heating it to 70° C. and allowing the sludge which forms to settle out. The supernatant solution will then be free from stannic sulfate.

For any given air flow through the tin bed 11, there should be sufficient liquid flow therethrough to prevent the formation of an insoluble stannic oxide film on the tin bed. This film deactivates the tin bed or catalyzes the reaction towards the formation of the stannic form rather than the stannous form.

In the following claims, the reaction with tin is described to take place in the presence of "oxygen." These claims are intended to cover not only the use of oxygen in substantially pure form but also when incorporated in air.

What is claimed is:

1. The process of manufacturing stannous sulfate which comprises the steps of passing continuously a solution of sulfuric acid through a bed of substantially pure tin in the presence of oxygen and in the absence of chlorine and chlorine containing compounds, to produce a solution of stannous sulfate, continuously separating stannous sulfate out of solution by adding sulfuric acid thereto, continuously separating the precipitated stannous sulfate from the mother liquor, and continuously returning the mother liquor to said tin bed for recycling.

2. The process of manufacturing stannous sulfate which comprises the steps of reacting substantially pure tin, oxygen and sulfuric acid at a low temperature to produce a solution of stannous sulfate, separating stannous sulfate out of solution by adding sulfuric acid thereto and by heating, separating the precipitated stannous sulfate from the mother liquor, and preparing a new starting solution with the mother liquor.

3. The process of manufacturing stannous sulfate which comprises the steps of reacting tin, oxygen and sulfuric acid at a temperature of about 20 to 25° C. to produce a solution of stannous sulfate, subsequently separating stannous sulfate out of solution by adding sulfuric acid thereto and by heating to a temperature of about 65 to 75° C., separating the precipitated stannous sulfate from the mother liquor and preparing a new starting solution with the mother liquor.

4. The process of manufacturing stannous sulfate which comprises the steps of passing a starting solution of sulfuric acid through a tin bed in the presence of oxygen to produce a solution of stannous sulfate, subsequently separating stannous sulfate out of solution by adding sulfuric acid thereto and preparing a new starting solution with the mother liquor.

5. The process of manufacturing stannous sulfate which comprises the steps of continuously recycling a solution of sulfuric acid through a tin bed in the presence of oxygen at a low temperature to produce a solution of stannous sulfate, the initial concentration of the sulfuric acid in said solution being sufficiently high to produce a solution of stannous sulfate having a maximum tin concentration at that temperature, subsequently separating stannous sulfate out of the tin saturated solution by adding sulfuric acid thereto and by heating, continuously separating the precipitated stannous sulfate from the mother liquor and continuously returning the mother liquor to said tin bed for recycling.

6. The process of manufacturing stannous sulfate which comprises the steps of recycling a solution of sulfuric acid at an approximate initial concentration of between 145 and 155 grams per liter through a tin bed and simultaneously forcing air through said tin bed at a temperature of approximately between 20 and 25° C. until a solution of stannous sulfate having a tin concentration of about 180 grams per liter is produced, subsequently separating stannous sulfate out of solution by adding concentrated sulfuric acid thereto and by heating, and reusing the mother liquor for the preparation of a new starting solution of sulfuric acid.

7. The process of manufacturing stannous sulfate which comprises the steps of recycling a solution of sulfuric acid at an approximate initial concentration of between 145 and 155 grams per liter through a tin bed and simultaneously forcing air through said tin bed at a temperature of between 20 and 25° C. until a solution of stannous sulfate having a tin concentration of about 180 grams per liter is produced, and subsequently separating stannous sulfate out of solution by adding concentrated sulfuric acid thereto and by heating the latter solution to the point where the mother liquor will have a tin concentration of about 80 grams per liter.

8. The process of manufacturing stannous sulfate which comprises the steps of passing a solution of sulfuric acid through a tin bed in the presence of oxygen and at a low temperature to produce a solution of stannous sulfate, subsequently treating said latter solution to a primary salting-out process by the addition of concentrated sulfuric acid and by heating to separate stannous sulfate out of solution, reusing enough of the mother liquor in the preparation of a new starting solution of sulfuric acid to make up substantially for the stannous sulfate separated out of solution, and subjecting the excess motor liquor to a secondary salting-out process by the addition of concentrated sulfuric acid to recover tin value therefrom before discarding said excess mother liquor.

9. The process of manufacturing stannous sulfate which comprises the steps of recycling a solution of sulfuric acid at an approximate initial concentration of between 145 and 155 grams per liter through a bed of tin in finely divided form and simultaneously forcing air through said tin bed at a temperature of approximately between 20 and 25° C. until a solution of stannous sulfate having a tin concentration of about 180 grams per liter is produced, subsequently separating stannous sulfate by a primary salting-out process by adding concentrated sulfuric acid thereto in sufficient amount and by heating to a sufficient temperature to separate stannous sulfate and produce a mother liquor having a tin concentration of about 80 grams per liter, reusing enough of the mother liquor in the preparation of a new starting solution of sulfuric acid to make up substantially for the stannous sulfate separated out of solution, and subjecting the excess mother liquor to a secondary salting-out process by the addition of concentrated sulfuric acid to recover tin values therefrom before discarding said excess mother liquor.

10. A system for manufacturing stannous sulfate comprising a hold tank for a solution of sulfuric acid, a tower for holding a tin bed therein, a connection to said tower for forcing oxygen through said tin bed, piping forming with said tower and said hold tank a recirculating system for recirculating the sulfuric acid solution between said hold tank and said tower and between said tower and said hold tank and for recycling the sulfuric acid solution through said tin bed in the presence of oxygen to produce a solution of stannous sulfate of the desired concentration, a salting-out tank for separating stannous sulfate out of the recycled solution, a connection to said salting-out tank from a source of salting-out sulfuric acid, a connection from said recirculating system to said salting-out tank for conducting the recycled solution to said salting-out tank, and piping for returning the bulk of the mother liquor formed by the separation of the stannous sulfate out of solution to said hold tank for reuse, before return to said tower through said recirculating system.

11. A system for manufacturing stannous sulfate comprising a hold tank for a solution of sulfuric acid, a tower for holding a tin bed therein, a connection to said tower for forcing oxygen through said tin bed, piping forming with said tower and said hold tank a recirculating system for recirculating the sulfuric acid solution between said hold tank and said tower and between said tower and said hold tank and for recycling the sulfuric acid through said tin bed in the presence of oxygen to produce a solution of stannous sulfate of the desired concentration, a primary salting-out tank for separating stannous sulfate out of the recycled solution, a connection to said salting-out tank from a source of salting-out sulfuric acid, a connection from said recirculating system to said salting-out tank for conducting the recycled solution to said salting-out tank, piping for returning the bulk of the mother liquor formed by the separation of the stannous sulfate out of solution to said hold tank for reuse, before return to said tower through said recirculating system, a secondary salting-out tank for separating stannous sulfate out of the remainder of said mother liquor, a connection for conducting the remainder of said mother liquor not returned to said hold tank to said secondary salting-out tank, and a connection to said secondary salting-out tank from a source of salting-out sulfuric acid.

References Cited in the file of this patent

UNITED STATES PATENTS

| | | |
|---|---|---|
| 483,245 | Bang | Sept. 27, 1892 |
| 1,012,511 | Brandenburg | Dec. 19, 1911 |
| 1,869,521 | Souviron | Aug. 2, 1932 |
| 1,944,444 | Marsh et al. | Jan. 23, 1934 |
| 2,122,997 | Abbott et al. | July 5, 1938 |
| 2,208,138 | Robinson | July 16, 1940 |

FOREIGN PATENTS

| | | |
|---|---|---|
| 541 | Great Britain | of 1857 |
| 7,544 | Great Britain | of 1894 |
| 232,281 | Great Britain | Apr. 15, 1925 |

OTHER REFERENCES

Mantell: "Tin—Mining, Production, Technology and Applications," A. C. S. Monograph Series, Reinhold Publishing Corp., N. Y., 1949, page 161.

Roscoe and Schorlemmer: A Treatise on Chemistry, 1907, MacMillan and Co., London, vol. II, page 841.

Mellor: Comprehensive Treatise on Inorganic and Theoretical Chemistry, vol. 7, 1927, pages 328, 477, 479 and 478; vol. 2, pages 77, 91, 371, Longmans, Green and Co., N. Y.

Scott and Davis: "Detinning of Scrap Tin Plate," Industrial and Engineering Chemistry, vol. 22, No. 8, pages 910–911, Amer. Chem. Soc., Washington, D. C., August 1930.

Seidell: Solubilities of Inorganic Compounds, D. Van Nostrand, New York, 1919, page 728, vol. 1.

Mantell: "Tin," A. C. S. Monograph 51, Chemical Catalogue Co., N. Y., 1929, page 306; and 1949, pages 459, 460, 525, 526.

Smith Kendall: "Inorganic Chemistry," Appleton Century Co., N. Y., 1937, pages 371, 372, 756, 757, 759, 760.